(12) United States Patent
Duchaine et al.

(10) Patent No.: US 10,947,903 B2
(45) Date of Patent: Mar. 16, 2021

(54) CLOGGING MONITORING IN A STARTER INJECTOR PURGE CIRCUIT FOR A TURBOMACHINE

(71) Applicant: SAFRAN HELICOPTER ENGINES, Bordes (FR)

(72) Inventors: Patrick Duchaine, Moissy-Cramayel (FR); Pascal Hubert Verdier, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 135 days.

(21) Appl. No.: 16/310,262

(22) PCT Filed: Jun. 15, 2017

(86) PCT No.: PCT/FR2017/051553
§ 371 (c)(1),
(2) Date: Dec. 14, 2018

(87) PCT Pub. No.: WO2017/216490
PCT Pub. Date: Dec. 21, 2017

(65) Prior Publication Data
US 2019/0249604 A1  Aug. 15, 2019

(30) Foreign Application Priority Data
Jun. 17, 2016  (FR) ...................... 16 55658

(51) Int. Cl.
*F02C 7/232* (2006.01)
*F02C 7/228* (2006.01)
*F02C 7/264* (2006.01)
(52) U.S. Cl.
CPC .............. *F02C 7/228* (2013.01); *F02C 7/232* (2013.01); *F02C 7/264* (2013.01);
(Continued)

(58) Field of Classification Search
CPC .. F02C 7/232; F02C 7/22; F02C 7/228; F02C 7/222; F05D 2260/80; F05D 2260/602; F05D 2260/607; F23D 2209/30
See application file for complete search history.

(56) References Cited

U.S. PATENT DOCUMENTS 5,477,731 A    12/1995  Mouton
9,771,906 B2 *  9/2017  Henson ................... F02C 9/263
(Continued)

FOREIGN PATENT DOCUMENTS

CA    2 901 520 A1    8/2014
FR    2 949 352       3/2011
(Continued)

OTHER PUBLICATIONS

International Search Report dated Aug. 30, 2017 in PCT/FR2017/051553 filed Jun. 15, 2017.

*Primary Examiner* — Scott J Walthour
*Assistant Examiner* — Todd N Jordan
(74) *Attorney, Agent, or Firm* — Oblon, McClelland, Maier & Neustadt, L.L.P.

(57) ABSTRACT

A fuel supply system for a turbomachine. The supply system includes a starter circuit, at least one first hydraulic resistance and a purge circuit. The purge circuit includes a duct including an opening at the exterior of the supply system. The purge circuit is configured to make purge air flow between a starter injector and the opening through the first hydraulic resistance. The supply system includes a device for measuring a value representative of pressure, which devices are configured to measure a value representative of pressure between the starter injector and the first hydraulic resistance when purge air flows between the starter injector and the first hydraulic resistance.

9 Claims, 4 Drawing Sheets

(52) U.S. Cl.
CPC .. *F05D 2260/602* (2013.01); *F05D 2260/607* (2013.01); *F05D 2260/80* (2013.01); *F05D 2270/3015* (2013.01); *Y02T 50/60* (2013.01)

(56) References Cited

U.S. PATENT DOCUMENTS

| | | |
|---|---|---|
| 2011/0054811 A1 | 3/2011 | Contini et al. |
| 2015/0369489 A1 | 12/2015 | Badet et al. |
| 2015/0377059 A1 | 12/2015 | Debbouz et al. |

FOREIGN PATENT DOCUMENTS

| | | | |
|---|---|---|---|
| FR | 2 987 400 | 8/2013 | |
| GB | 2 278 295 A | 11/1994 | |
| WO | WO 2014/118457 A1 | 8/2014 | |
| WO | WO-2014118457 A1 * | 8/2014 | ............. F23R 3/343 |

* cited by examiner

Legend
115: hydraulic resistance
126: starter injector
141: pressure sensor
150: electronic regulation system
151: first electronic regulation module
152: second electronic regulation module
154: alert device
160: monitoring device Legend
115: hydraulic resistance
126: starter injector
141: pressure sensor
150: electronic regulation system
151: first electronic regulation module
152: second electronic regulation module
154: alert device
160: monitoring device

CLOGGING MONITORING IN A STARTER INJECTOR PURGE CIRCUIT FOR A TURBOMACHINE

TECHNICAL FIELD

The invention relates to fuel supply systems for an aircraft turbomachine. More precisely, it is concerned with clogging monitoring within the supply system.

STATE OF PRIOR ART

A fuel supply system for a turbomachine generally comprises a starter circuit and a main circuit.

In a known manner, the starter circuit is only supplied with fuel during the starting phase. Once the turbomachine starting is made, the starter circuit is purged to avoid stagnation of fuel. Indeed, a stagnation of fuel could result in coking, that is solid carbon deposits, which risks clogging the supply system.

One way of purging the starter circuit consists in communicating, after the end of the starting phase, the supply piping of the starter injectors with air at atmospheric pressure. The fuel present in the injector and the pipings is thus purged because of the pressure difference between pressurised air from the compressor outlet and air at atmospheric pressure. Such a phenomenon is referred to as reverse purge, because purge air circulates in the reverse direction to that of the fuel during the starting phase.

In spite of these precautions, coking occurs, under some conditions, in the starter circuit and the circuit de purge, which results in a partial or total clogging of the supply system.

Thus, there is a need for monitoring clogging of the starter circuit and/or the purge circuit.

DISCLOSURE OF THE INVENTION

The invention aims at solving at least partially the problems encountered in solutions of prior art.

In this regard, the object of the invention is a fuel supply system for a turbomachine. The supply system comprises:
- a starter circuit comprising at least one starter injector, at least one first hydraulic resistance, et
- a purge circuit comprising a conduit including an aperture opening outside of the supply system. The purge circuit is configured to flow purge air between the starter injector and the aperture, through the first hydraulic resistance.

According to the invention, the supply system comprises a pressure representative value measuring means configured to measure a pressure representative value between the starter injector and the first hydraulic resistance, during a purge air flow between the starter injector and the first hydraulic resistance.

Thus, the pressure representative value enables clogging in the starter circuit and/or the purge circuit to be detected, before this clogging is such that it results in a turbomachine downtime.

Once a clogging has been detected, the required maintenance operations can occur before the downtime of the turbomachine comprising the supply system. These maintenance operations comprise for example scrubbing and/or replacing components of the supply system.

The invention can optionally include one or more of the following characteristics combined to each other or not.

It is possible that the purge circuit comprises a second hydraulic resistance located between the first hydraulic resistance and the starter injector. In this case, the measuring means is configured to measure the pressure representative value between the first hydraulic resistance and the second hydraulic resistance.

According to a particular embodiment, the first hydraulic resistance and/or the second hydraulic resistance comprise a valve, a filter and/or a flow restrictor such as a purge conduit shrinkage.

According to an advantageous embodiment, the supply system comprises a clogging monitoring device configured to compare the pressure representative value with a reference value.

Advantageously, the monitoring device is configured to signal a clogging piece of information, if the absolute value of the difference between the pressure representative value and the reference value exceeds a first threshold value.

According to an advantageous embodiment, the monitoring device is configured to signal a clogging piece of information of a first part of the purge circuit, located upstream of the place of the measurement of the pressure representative value, if:
- a relative value of the difference between the pressure representative value and the reference value is negative, and that
- the relative value of the difference is lower than a second threshold value.

According to another advantageous embodiment, the monitoring device is configured to signal a clogging piece of information of a second part of the purge circuit, located downstream of the place of the measurement of the pressure representative value, if:
- the relative value of the difference between the pressure representative value and the reference value is positive, and that
- the relative value of the difference is higher than a third threshold value.

The terms "upstream" and "downstream" are defined in the purge circuit with respect to the direction of the purge air flow.

Preferably, the purge circuit is a so-called reverse purge circuit, that is purge air flows in the reverse direction to that taken by fuel to initiate combustion in the turbomachine. The purge air thereby passes earlier through the starter injectors which would be particularly likely to be "coked".

Advantageously, the supply system comprises an alert device configured to be triggered in case of signalling a clogging piece of information by the monitoring device.

The invention also relates to a turbomachine comprising a supply system as defined above. Preferably, the turbomachine is an aircraft turbomachine such as a turbojet engine or a turboprop engine.

The invention is also concerned with a method for monitoring clogging of a fuel supply system as defined above.

Advantageously, the monitoring method comprises a step of signalling a clogging piece of information, if the absolute value of the difference between the pressure representative value and the reference value exceeds the first threshold value,
wherein the pressure representative value is measured between the starter injector and the first hydraulic resistance, during a purge air flow between the starter injector and the first hydraulic resistance.

According to an advantageous embodiment, the purge air flow occurs from the starter injector to the aperture, through the first hydraulic resistance.

According to another advantageous embodiment, the reference value is predetermined.

Alternatively, the reference value is determined as a function of at least one pressure representative value during at least one previous flight of the turbomachine which is an aircraft turbomachine.

BRIEF DESCRIPTION OF THE DRAWINGS

The present invention will be better understood upon reading the description of exemplary embodiments, given by way of purely indicating and no way limiting purposes, making reference to the appended drawings in which.

DETAILED DISCLOSURE OF PARTICULAR EMBODIMENTS

Figure 1:
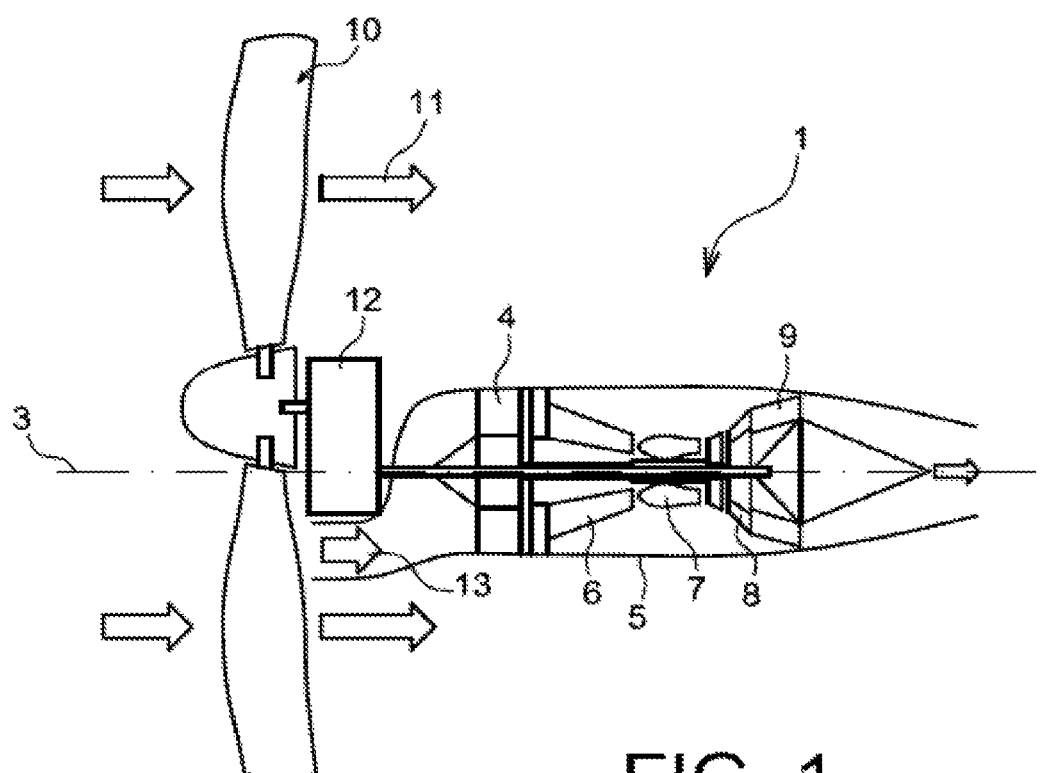
FIG. 1 is a longitudinal cross-section partial schematic representation of a turbomachine, according to a preferred embodiment of the invention.

Identical, similar or equivalent parts of the different figures bear the same reference numerals so as to facilitate switching from one Fig. to the other.

FIG. 1 represents a turboprop engine 1 which is partially annular about an axis 3 of power turbine.

The turbomachine 1 includes, from upstream to downstream considering a direction of travel to the axis 3, a propeller 10, a speed reducer 12, case radial arms 4, a compressor 6, a combustion chamber 7, a high pressure turbine 8 and a power turbine 9.

The compressor 6, the combustion chamber 7, the high pressure turbine 8 and the power turbine 9 are surrounded by a case 5. They commonly define in connection with the case 5 a primary stream 13 through which a primary flow flows in the direction opposite to the turbomachine direction of advance. The flow direction of the primary flow is represented by the arrow 11. This direction also corresponds to that of the thrust force of the turbomachine 1 in use.

The gas thrust at the outlet of the combustion chamber 7 causes the compressor 6 and the turbines 8 and 9 to rotate about the axis 3 of the power turbine.

The rotation of the power turbine 9 about its axis 3 is transmitted to the propeller 10 through the speed reducer 12, to rotate it.

Figure 2:
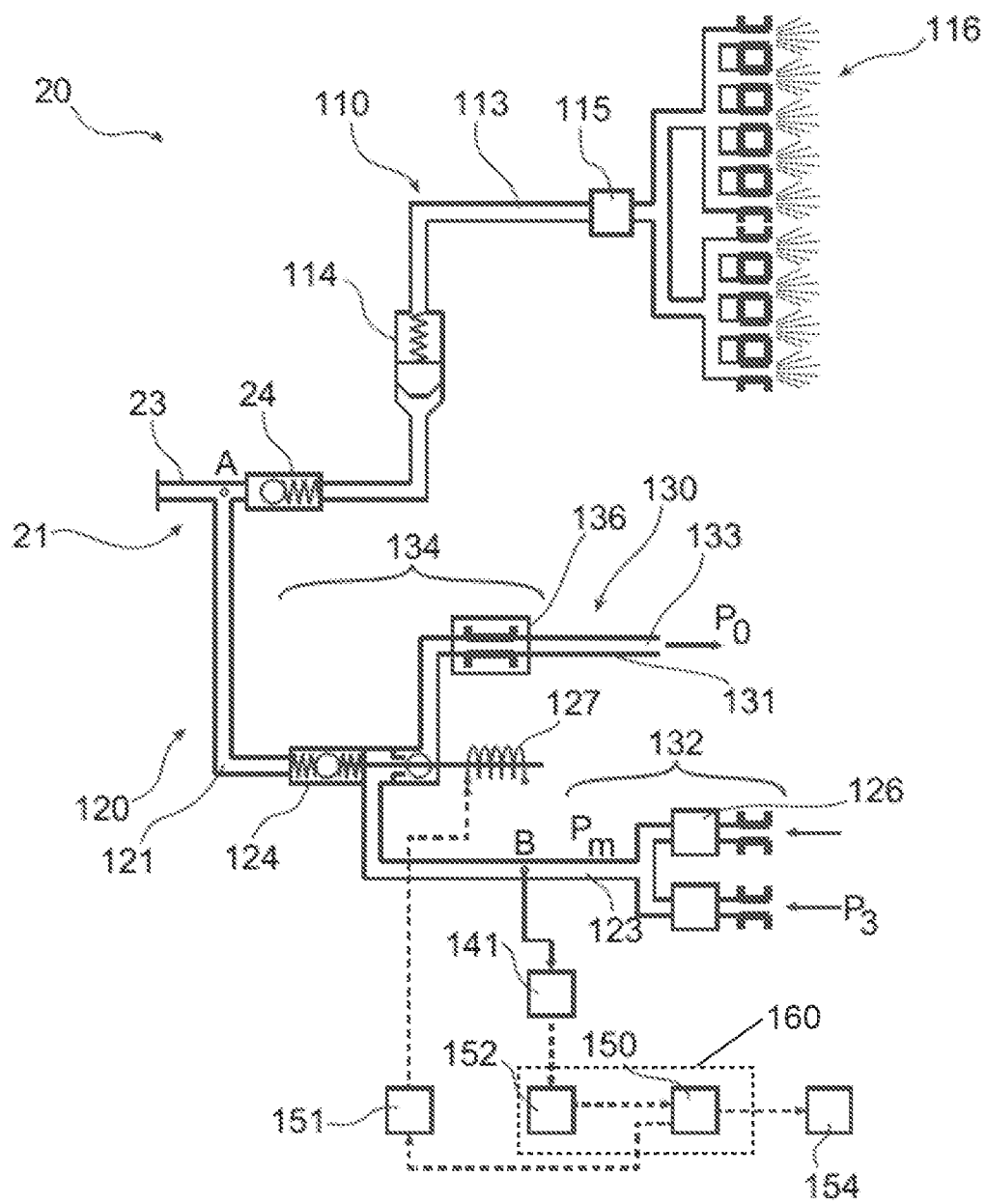
FIG. 2 is a partial schematic representation of a fuel supply system for a turbomachine, according to a first embodiment of the invention.

FIG. 2 represents a fuel supply system 20 for the combustion chamber 7.

The supply system 20 comprises an upstream circuit 21 comprising a distribution conduit 23 which leads to a node A for separating a main circuit 110 from a starter circuit 120.

The separating node A is located at a distribution valve 24 which is configured to distribute fuel between the main circuit 110 and the starter circuit 120. This valve 24 comprises for example a spool (not represented) to make the fuel pressure in the main circuit 110 equal to that in the starter circuit 120.

The main circuit 110 comprises a valve 114, a supply conduit for the main injectors 113 and the main injectors 116. These main injectors 116 supply the combustion chamber 2 of the turbomachine 1 with fuel in a steady state condition.

The main circuit 110 also includes a hydraulic resistance 115 comprising a filter, an exchanger and/or a flow meter. The hydraulic resistance 115 is located between the valve 114 and the main injectors 116.

The term "hydraulic resistance" is used to define in this document, by analogy with the electricity field, the magnitude from the ratio of the fluid pressure difference between inlet and outlet of an element of the supply system to the fluid flow rate passing through the element, as well as the element characterised by this magnitude.

The starter circuit 120 includes an inlet conduit 121 which is connected at its first end to the separating node A and at its second end, opposite to the first end, to a regulating valve 124. The regulating valve 124 is fluidly connected to the starter injectors 126.

These starter injectors 126 are in the proximity of spark plugs (not represented), so as to initiate combustion in the combustion chamber 2. They are distinct from the main injectors 116. Once the combustion has been initiated in the turbomachine 1, the starter injectors 116 are turned OFF and purge air passes through them.

The regulating valve 124 comprises a first outlet which opens into a conduit 123 for supplying the starter injectors and a second outlet which opens into a purge conduit 131 of a purge circuit 130.

The regulating valve 124 includes a closure member movable between a first opening position where it releases the first outlet and a second opening position in which it releases the second outlet.

When the closure member is in the first opening position, it causes fuel to flows from the inlet conduit 121 to the first outlet, towards the starter injectors 126. It prevents air or fuel from being circulated between the starter injectors 126 and the purge conduit 131.

When the closure member is in the second opening position, it causes purge air to circulate between the starter injectors 126 and the purge conduit 131. It prevents fuel from flowing from the inlet conduit 121 to the starter injectors 126.

The regulating valve 124 is electrically controlled. The closure member position is controlled by the electronic regulation system 150 of the turbomachine 1, through a first electronic regulation module 151 and a solenoid 127.

The electronic regulation system 150 is also known as "FADEC" or "Full Authority Digital Engine Control". Conventionally, this electronic regulation system 150 comprises an engine calculator with two full authority redundant symmetric ways.

The purge circuit 130 comprises means for injecting hot pressurised air from the compressor 6, the starter injectors 126, the regulating valve 124 and a flow restrictor 136.

The starter injectors 126, the regulating valve 124, as well as the conduit 123 for supplying the starter injectors are common to the starter circuit 120 and the purge circuit 130.

The purge circuit 130 also comprises the purge conduit 131 which opens into the second outlet of the regulating valve 124. The purge conduit 131 and the flow restrictor 136 are specific to the purge circuit 130.

The purge conduit 131 comprises an aperture 133 which opens outside of the supply system 20. The aperture 133 is located at the end of the purge conduit which is opposite to that which opens into the regulating valve 124.

The flow restrictor 136 takes for example the form of a shrinkage of the purge conduit 131. It limits fuel leaks in case of a failure of the regulating valve 124.

The air injecting means inject air from the compressor 6 at the starter injectors 126 and towards the flow restrictor 136.

The purge circuit 130 is thereby a so-called "reverse" purge circuit, that is purge air flows in the contrary direction to that taken by fuel to initiate combustion in the turbomachine.

In the document, the terms "upstream" and "downstream" are used in reference to the purge circuit 130, with respect to the flow direction of the purge air and unless otherwise set out.

The purge air flows from the compressor 6, through the starter injectors 126, the conduit 123 for supplying the starter injectors, the regulating valve 124, the flow restrictor 136 and the aperture 133 of the purge conduit 131 successively.

Air at the aperture 133 is at a pressure $P_0$ which is that of ambient air. It is lower than $P_3$ of air from the compressor 6 which is at the starter injectors 126.

The supply system 20 also comprises a pressure sensor 141 which plays the role of pressure representative value measurement means. The pressure representative value $P_m$ is a pressure measurement value.

The pressure sensor 141 measures the pressure in the conduit 123 for supplying the starter injectors 126 in the place which is represented in FIG. 2 by a first measurement node B. This first measurement node B is located between the starter injectors 126 and the regulating valve 124 which is a hydraulic resistance for purge air.

The starter injectors 126 are upstream of the first measurement node B, relative to the purge air flow in the purge circuit 130. Therefore, they form an upstream part 132 of the purge circuit 130.

The regulating valve 124 and the flow restrictor 126 are downstream of the first measurement node B, relative to the purge air flow in the purge circuit 130. They form a downstream part 134 of the purge circuit 130.

Figure 3:
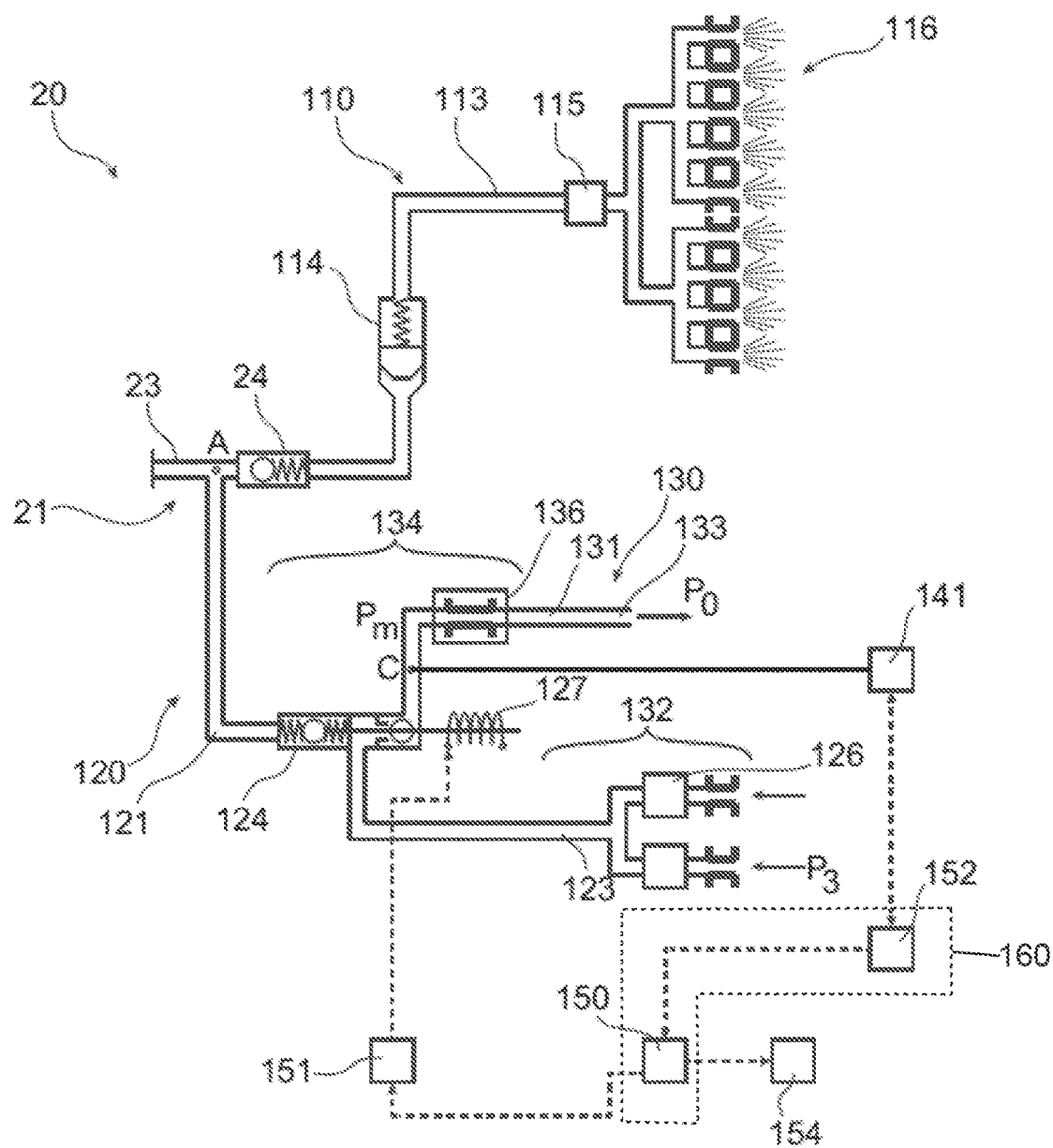
FIG. 3 is a partial schematic representation of a fuel supply system for a turbomachine, according to a second embodiment of the invention.

The second embodiment, which is represented in reference to FIG. 3, is distinguished from the first embodiment by the place of the measurement of the pressure representative value $P_m$.

In the second embodiment, the pressure sensor 141 measures pressure in the purge conduit 131 between the flow restrictor 136 and the regulating valve 124, at a place which is represented by the second measurement node C in FIG. 3.

The flow restrictor 136 plays the role of the first hydraulic resistance, the regulating valve 124 plays the role of the second hydraulic resistance. The measurement of the pressure representative value $P_m$ thereby occurs between this first hydraulic resistance and this second hydraulic resistance.

The starter injectors 126 and the regulating valve 124 are upstream of the second measurement node C, relative to the purge air flow in the purge circuit 130. Therefore, they form an upstream part 132 of the purge circuit 130.

The flow restrictor 136 is downstream of the second measurement node C, relative to the purge air flow in the purge circuit 130. It forms a downstream part 134 of the purge circuit 130.

In the first and in the second embodiment, the signal emitted by the pressure sensor 141 is transmitted to a second electronic control module 152 and to the electronic regulation system 150.

The second control module 152 and the electronic regulation system 150 comprise a memory and means for processing the pressure representative value $P_m$.

They form a monitoring device 160 for monitoring clogging of the supply system 20, in particular the purge circuit 130. The monitoring device 160 is for signalling a clogging piece of information to an alert device 154.

The clogging piece of information indicates a clogging start in the supply system 20 and/or a statistically significant risk that the turbomachine 1 is in downtime with a predetermined number of flights because of clogging.

The alert device 154 is triggered in case of signalling a clogging piece of information by the monitoring device 160. It emits a light, tactile and/or sound alert, in order to inform a pilot and/or a maintenance operator of a clogging risk in time.

Figure 4:
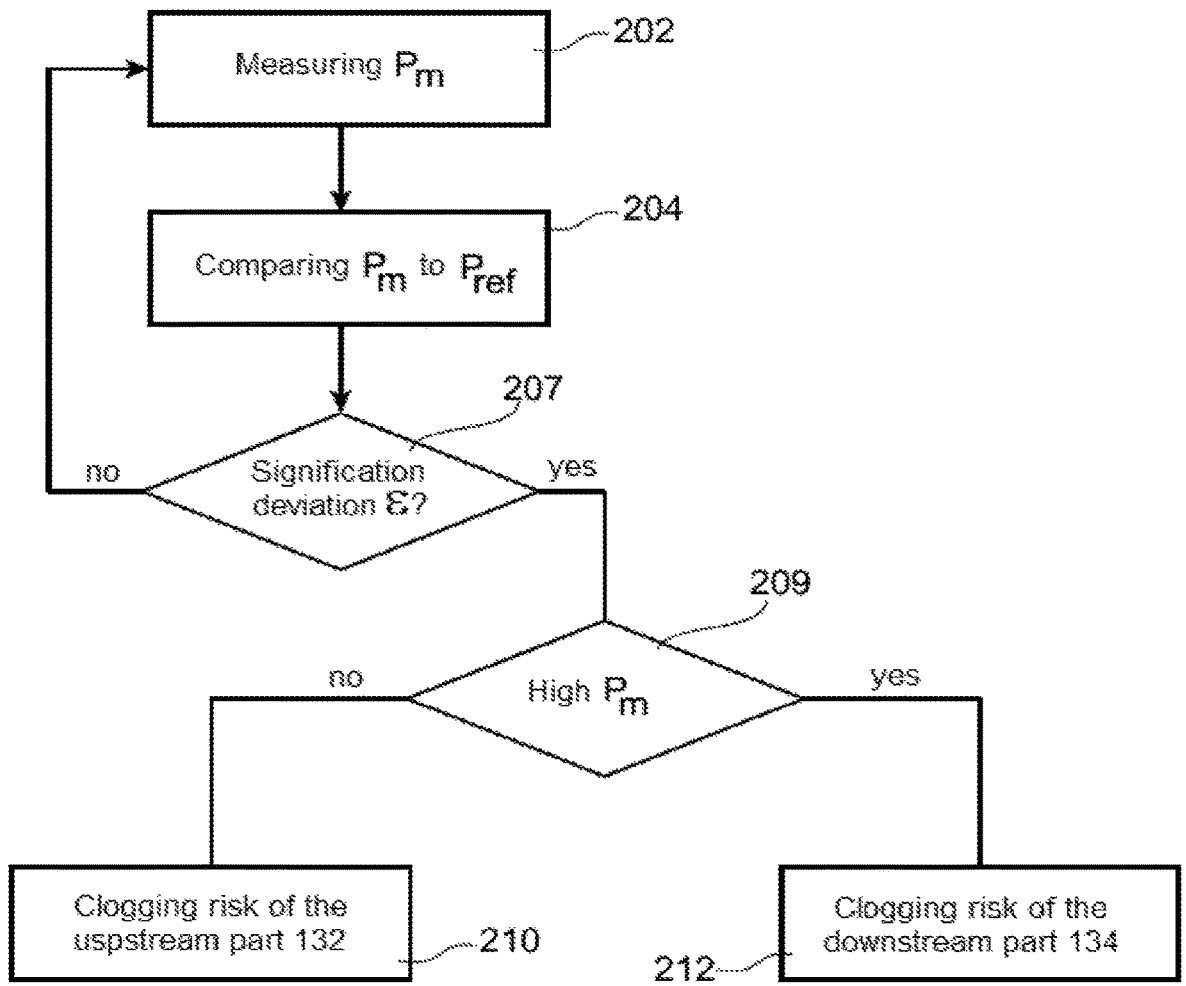
FIG. 4 illustrates the implementation of a clogging detection method in a supply system according to the first or the second embodiment of the invention.

The method for monitoring a clogging of the supply system 20, in particular of the purge circuit 130 is illustrated in FIG. 4.

The pressure representative value $P_m$ is first measured in the supply system, at the first node B and/or the second node C, in a measuring step 202. The measuring step 202 occurs during a purge air flow from the starter injectors 126 to the aperture 133, through the regulating valve 124 and the flow restrictor 136.

Then, the monitoring device 160 compares the pressure representative value $P_m$ with a reference value $P_{ref}$, in a comparing step 204.

The reference value $P_{ref}$ is either predetermined, or it corresponds to an old, possibly averaged, value, of the pressure representative value $P_m$.

When it is predetermined, the reference value $P_{ref}$ corresponds to a pressure nominal value in the conduit 123 for supplying the starter injectors.

When it is determined as a function of the pressure change in the supply conduit 123, the reference value $P_{ref}$ is set from at least one pressure representative value $P_m$ during at least one previous flight of the turbomachine 1.

The monitoring device 160 then signals a clogging piece of information if the difference a between the pressure representative value $P_m$ and a reference value $P_{ref}$ is high enough, in a step 207.

The monitoring device 160 signals a clogging piece of information, if the absolute value of the difference ε between the pressure representative value $P_m$ and the reference value $P_{ref}$ exceeds a first threshold value $S_1$. This condition is called a "first condition".

The monitoring device 160 does not necessarily calculate the absolute value of the difference ε, to check the first condition. It is sufficient for it to calculate for example the relative value of the difference e between the pressure representative value $P_m$ and the reference value $P_{ref}$.

The monitoring device 160 checks whether a significant decrease in the pressure representative value $P_m$ is detected, by comparison with the reference value $P_{ref}$, in step 209. This condition is called a "second condition".

The second condition amounts to checking whether:
a relative value of the difference E between the pressure representative value $P_m$ and the reference value $P_{ref}$ is negative and that
the relative value of the difference E is lower than a second threshold value $S_2$.

In the first and second embodiments, the second threshold value $S_2$ has an opposite value to that of the first threshold value $S_1$.

The monitoring device 160 also checks whether a significant increase in the pressure representative value $P_m$ is detected, by comparison with the reference value $P_{ref}$, in step 209. This condition is called a "third condition".

The third condition amounts to checking whether:
the relative value of the difference E between the pressure representative value $P_m$ and the reference value $P_{ref}$ is positive and that
the relative value of the difference E is higher than a third threshold value $S_3$.

In the first and second embodiments, the third threshold value $S_3$ is equal to that of the first threshold value $S_1$.

Checking the second condition and the third condition can be made at the same time as checking the first condition, since the absolute values of the thresholds $S_1$, $S_2$ and $S_3$ are identical. In other words, steps 207 and 209 can be the same.

When the second condition is met, the monitoring device 160 has noticed a significant decrease in the pressure representative value $P_m$. Thereby, it signals a piece of information of clogging of the upstream part 132 of the purge circuit, that is upstream of the place of the measurement of the pressure representative value $P_m$ relative to the purge air flow.

The alert device 154 alerts the pilot and/or a maintenance operator of a clogging risk of the starter injectors 126, in a step 210 and in reference to the first embodiment.

The alert device 154 alerts the pilot and/or a maintenance operator of a clogging risk of the starter injectors 126 and/or the regulating valve 124, in a step 210 and in reference to the second embodiment.

When the third condition is met, the monitoring device 160 has noticed a significant increase in the pressure representative value $P_m$. Then, it signals a piece of information of clogging of the downstream part 134 of the purge circuit, that is downstream of the place of the measurement of the pressure representative value $P_m$ relative to the purge air flow.

The alert device 154 alerts the pilot and/or a maintenance operator of a clogging risk of the regulating valve 124 and/or the flow restrictor 136, in a step 212 and in reference to the first embodiment.

The alert device 154 alerts the pilot and/or a maintenance operator of a clogging risk of the flow restrictor 136, in a step 212 and in reference to the second embodiment.

Of course, various modifications can be made by those skilled in the art to the invention just described without departing from the scope of the invention.

The flow restrictor 136 is a hydraulic resistance which can take a different form.

The pressure representative value measuring means 141 can comprise a temperature sensor, in addition to or in place of the pressure sensor. The pressure representative value $P_m$ is thereby a temperature measurement. In this case, the pressure at the measurement nodes B and/or C is determined using an air equation of state from this temperature measurement.

The supply system 20 can both make measurements of pressure representative values $P_m$ at the first measurement node B and at the second measurement node C. In this case, the monitoring device 160 enables a clogging risk of the regulating valve 124 to be better discriminated from a clogging risk of the injectors 126 and a clogging risk of the flow restrictor 136.

The pressure representative value $P_m$ is preferably measured upstream of the flow restrictor 136 in the purge circuit 130, to make a clogging detection easier.

The second threshold $S_2$ and/or the third threshold $S_3$ can have different values from that opposite to the first threshold $S_1$ and to the first threshold $S_1$, in particular if the pressure sensor 141 more readily detects a pressure increase or a pressure decrease or vice versa.

The embodiments represented in FIGS. 2 and 3 comprise a purge circuit 130 with a so-called "reverse" purge but of course, the purge air could circulate in the other direction in the purge circuit 130. The fuel and purge air would thereby circulate in the same direction in the purge circuit 130 and in the starter circuit 120.

Thereby, the purge air would flow from the compressor 6, through the aperture 133, the flow restrictor 136, the regulating valve 124 and the starter injectors 126 successively.

In such a configuration, the upstream 132 and downstream 134 parts would be exchanged with respect to the nodes B and/or C for measuring the pressure representative value.

When the second condition is met after a measurement at the first node B, the alert device 154 alerts the pilot and/or a maintenance operator of a clogging risk of the flow restrictor 136 and/or of the regulating valve 124, in a step 210.

When the second condition is met after a measurement at the second node C, the alert device 154 alerts the pilot and/or a maintenance operator of a clogging risk of the flow restrictor, in a step 210.

When the third condition is met after a measurement at the first node B, the alert device 154 alerts the pilot and/or a maintenance operator of a clogging risk of the starter injectors 126, in a step 212.

When the third condition is met after a measurement at the second node C, the alert device 154 alerts the pilot and/or a maintenance operator of a clogging risk of the regulating valve and/or the starter injectors 126, in a step 212.

The invention claimed is:

1. A fuel supply system for a turbomachine, comprising:
a starter circuit comprising a starter injector;
a first hydraulic resistance;
a purge circuit comprising a conduit, the conduit including an aperture, the aperture opening outside of the fuel supply system, wherein the first hydraulic resistance is positioned between the starter injector and the aperture;
a monitoring device; and
a pressure representing value measuring sensor,
wherein the purge circuit is configured to flow purge air between the starter injector and the aperture,
wherein the pressure representative value measuring sensor is configured to measure a pressure representative value, the pressure representative value measuring sensor being positioned between the starter injector and the first hydraulic resistance, wherein the pressure representative value is measured during a purge air flow between the starter injector and the first hydraulic resistance,
wherein the monitoring device is configured to compare the pressure representative value with a reference value,
wherein the monitoring device is configured to transmit a clogging signal to an alert device, and
wherein the monitoring device is configured to transmit the clogging signal if an absolute value of a difference between the pressure representative value and the reference value exceeds a threshold value.

2. The fuel supply system according to claim 1, wherein the purge circuit comprises a second hydraulic resistance located between the first hydraulic resistance and the starter injector,
wherein the pressure representative value measuring sensor is configured to measure the pressure representative value between the first hydraulic resistance and the second hydraulic resistance.

3. The fuel supply system according to claim 2, wherein at least one of the first hydraulic resistance or the second hydraulic resistance comprises at least one of a valve, a filter, or a purge conduit shrinkage.

4. The fuel supply system according to claim 1, wherein the clogging signal indicates clogging in a first part of the purge circuit, the first part of the purge circuit being located upstream of a location at which the pressure representative value is measured by the pressure representative value measuring sensor, if:
   a relative value of the difference between the pressure representative value and the reference value is negative, and
   the relative value of the difference is lower than a second threshold value.

5. The fuel supply system according to claim 1, wherein the clogging signal indicates clogging in a second part of the purge circuit, the second part of the purge circuit being located downstream of a location at which the pressure representative value is measured by the pressure representative value measuring sensor, if:
   the relative value of the difference between the pressure representative value and the reference value is positive, and
   the relative value of the difference is higher than a third threshold value.

6. A method for monitoring clogging of a fuel supply system for a turbomachine, wherein the fuel supply system comprises:
   a starter circuit comprising a starter injector;
   a first hydraulic resistance;
   a purge circuit comprising a conduit, the conduit including an aperture, wherein the aperture opens outside of the fuel supply system, wherein the purge circuit is configured to flow purge air between the starter injector and the aperture;
   a pressure representative value measuring sensor configured to measure a pressure representative value;
   a monitoring device configured to compare the pressure representative value with a reference value; and
   an alert device, wherein the first hydraulic resistance is positioned between the starter injector and the aperture, and wherein the pressure representative value measuring sensor is positioned between the starter injector and the first hydraulic resistance;
wherein the method comprises:
   directing a purge air flow between the starter injector and the aperture;
   measuring a pressure representative value with the pressure representative value measuring sensor during the purge air flow;
   comparing the pressure representative value with the reference value using the monitoring device; and
   transmitting a clogging signal from the monitoring device to the alert device if the absolute value of the difference between the pressure representative value and the reference value exceeds a first threshold value.

7. The method for monitoring clogging according to claim 6, wherein the purge air flow passes from the starter injector to the aperture, through the first hydraulic resistance.

8. The method for monitoring clogging according to claim 6, wherein the reference value is predetermined.

9. The method for monitoring clogging according to claim 6, wherein the reference value is determined as a function of at least one pressure representative value during at least one previous flight of the turbomachine, wherein the turbomachine is an aircraft turbomachine.

\* \* \* \* \*